June 7, 1955 O. H. SCHADE 2,710,308

COLOR TELEVISION

Filed Jan. 26, 1951 5 Sheets-Sheet 1

INVENTOR
Otto H. Schade
BY
ATTORNEY

INVENTOR
Otto H. Schade
BY Olin J. Mitchell
ATTORNEY

June 7, 1955 O. H. SCHADE 2,710,308

COLOR TELEVISION

Filed Jan. 26, 1951 5 Sheets-Sheet 3

INVENTOR
Otto H. Schade
BY [signature]
ATTORNEY

June 7, 1955 O. H. SCHADE 2,710,308

COLOR TELEVISION

Filed Jan. 26, 1951 5 Sheets-Sheet 4

INVENTOR
Otto H. Schade

ATTORNEY

June 7, 1955 O. H. SCHADE 2,710,308

COLOR TELEVISION

Filed Jan. 26, 1951 5 Sheets-Sheet 5

INVENTOR
Otto H. Schade
BY
ATTORNEY 2,710,308
Patented June 7, 1955

United States Patent Office 2,710,308

COLOR TELEVISION

Otto H. Schade, West Caldwell, N. J., assignor to Radio Corporation of America, a corporation of Delaware Application January 26, 1951, Serial No. 208,013

8 Claims. (Cl. 178—5.4)

This invention relates to color television and more particularly, although not necessarily exclusively, to novel methods of and means for generating sets of signals representative of component colors of a picture, scene, view or image and the maintenance of a desired color balance between or among the sets of signals.

Present day color television systems rely for their operation upon the fact that a colored image may be separated into component color images each corresponding to the relative amount of a different selected color, for example the primary colors, appearing throughout the picture, scene, image or view to be transmitted. One way in which this may be accomplished is by the use of color filters corresponding to the selected color components. By passing the light from the image through these filters, either simultaneously or sequentially there are obtained separate color component images each representing the proportion of a different color component present throughout the image. Color separating means other than optical color filters may be used such as dichroic mirrors, color sensitive pickup devices and the like. It will be clear that it is unnecessary to perform color separation over the entire image simultaneously, but that selected areas may be treated in sequence until the whole image has been analyzed.

Two basic systems have been suggested for utilizing the color component images so produced; one, to transmit information corresponding to each selected color simultaneously, and, the other, to transmit the information sequentially. In the latter case, it has been proposed to transmit in field or frame sequential order; line by line sequential order; or incremental area sequential order. In any system it is clear that for faithful reproduction of the image it is necessary that the transmitted color signals representing each color component be truly indicative of the proportion of each color component present in the image. This result may be termed color balance.

It has been difficult to realize true color balance in practice due to the fact that different components in color analyzing apparatus react differently. Thus a system adjusted to have perfect color balance when using one pickup tube may be out of balance when using another tube. Similarly, different sources of light may produce color unbalance and a direct pickup from a scene or view may react differently than color slides.

It is an object of this invention to provide methods of and means for generating sets of electrical color component signals which will be in color balance at the point of electrical signal generation.

It is a further object of the invention to provide novel methods of and means for electrically generating color component signals and independently adjusting the amplitudes of any one set of signals without disturbing the amplitude of any of the other sets of signals.

Still another object of the invention is to provide novel methods of and means for generating color component signals which will be maintained in color balance.

Briefly, in accordance with the invention, the output voltage of a tube for generating image signals or sets of image signals is applied to a plurality of variable impedances, one for each color component, connected in parallel. For the sake of brevity the signal generating tube will be referred to as a pickup tube. A portion of the voltage across each impedance is fed back inversely onto the control grid of the electron gun of the pickup tube through a commutating arrangement which applies the voltages to the control grid in synchronism with the presentation of the color component images to the face of the tube. By individually adjusting the degree of inverse feedback thus obtained for each color component, the sets of signals will be generated in true color balance.

The above and other objects and advantages of the invention will become apparent upon a consideration of the following detailed description of the invention taken in conjunction with the accompanying drawings in which.

For purposes of illustration, the invention will be described as applied to a three color field sequential system in which three sets of signals are generated sequentially. It is to be understood that the principles of the invention are equally applicable to any system using a pickup tube in which the signal is taken from the modulated scanning beam. Again for purposes of illustration, a single pickup tube has been shown. It will be clear that separate pickup tubes for each component color can be used without departing from the spirit of the invention. Other modifications will suggest themselves to those skilled in the art and are to be considered as falling within the scope of the invention as pointed out in the appended claims.

Figure 1:
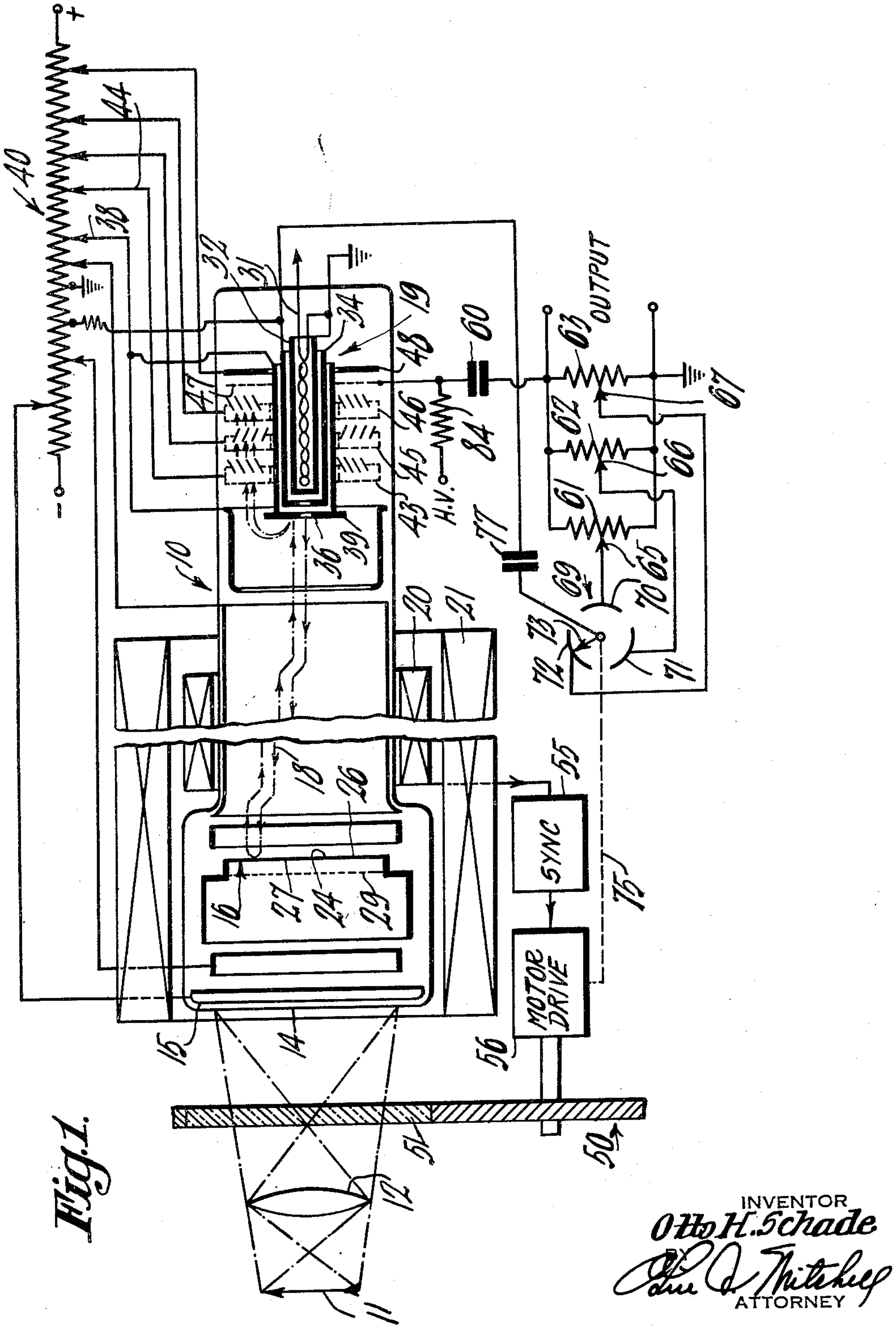
Fig. 1 represents schematically an embodiment of the invention.

Referring to Fig. 1, there has been provided a pickup tube 10 which may be of the orthicon or image orthicon type. For purposes of illustration a tube similar to that shown in United States Patent No. 2,532,793 granted December 5, 1950, to George C. Sziklai, has been shown. The tube 10 is housed or supported in any suitable manner (not shown) so that light from an image, scene, or object 11 to be televised may be imaged by suitable optical means indicated generally by the lens 12 upon the inside surface of the transparent tube end 14. The inside surface of the end wall 14 is coated or otherwise treated so as to form a photo-cathode 15. The pickup tube 10 also includes a storage surface or target 16 which is to be scanned by an electron beam 18 from an electron gun 19. There is also included in Fig. 1 a schematic showing of a magnetic deflection yoke 20 having horizontal and vertical deflection coils and a focusing coil 21. This organization of parts together with the beam deflecting means of the combined electrostatic and electromagnetic type, and a focusing coil are fully described in United States Patent No. 2,403,239 granted July 2, 1946, to Albert Rose and only those portions of the pickup tube 10 and its associated apparatus which are necessary to a complete understanding of the invention will be described in detail.

The target 16 is of the double sided type, and comprises a thin sheet of glass 24 with resistivity so chosen as to permit charges on its two sides 26 and 27 to unite by conduction in frame time. The glass target 24 is mounted close to a fine mesh signal screen 29 which collects secondary emission from the face 27 of the target 24 which is exposed to photo-electrons from the photo-cathode 15.

The assembly of electrodes constituting the electron gun 19 includes a heater 31 and a cathode 32 from which electrons may be drawn, a control electrode or grid 34, and a first anode 36. The grid 34 is suitably biased and the first anode is connected to a source of high potential 38.

The tube 10 preferably, but not necessarily, includes an electron multiplier means. In the illustrative means, the first anode 36 acts as the first multiplier and is shaped as indicated at 39 to perform this function.

Suitable biasing potentials are provided for the elements of the tube 10, for example and by way of illustration from a potentiometer 40.

The operation of this type of pickup tube is well known and it is not believed necessary to discuss its operation in detail in connection with this invention. Briefly, the operating surface 26 of the target 16 will have an electrostatic charge image which is a replica of that on the surface 27. Therefore, for a point on the photo-cathode 15 which is highly illuminated, there will be a corresponding point on the face which has a relatively high positive potential. Electrons in the beam 18, directed toward elemental areas of the face 26, which are positive, will be collected by these areas; whereas, electrons approaching areas corresponding with an unilluminated area of the photo-cathode 15, will be deflected from the target and will reach the first anode 36 which also serves as a first multiplier. Those electrons impinging on the front portion 39 of the first anode 36 release a great number of secondary electrons which are drawn toward the second multiplier 43. This second multiplier 43 is connected to a source of potential 44 which is positive with respect to source 38. The energy is similarly multiplied at the third, fourth and fifth multipliers 45, 46 and 48 and the released electrons impinge upon a collector element 47. In normal operation of the tube 10, the image signal is taken from the collector 47.

In accordance with the invention, there is provided between the lens 12 and the end wall 14 of the tube 10 means for separating the scene, image or object 11 to be televised into component images representing selected component colors present in the screen 11. For purposes of illustration, this has been shown as a color filter disc 50. As is well known, the disc 50 comprises a plurality of transparent filter sections 51, only one of which is shown, arranged circumferentially about the disc 50. Rotation of the filter disc 50 results in the sequential presentation of the component images to the tube 10. The filter sections 51 are of the type which will allow only light of a selected color to pass therethrough. At least one filter section for each of the selected color components will be provided and they are arranged in the desired sequence about the filter disc 50. One suitable filter disc is shown in United States Patent No. 2,428,946 granted October 14, 1947, to F. J. Somers. It is to be understood that the particular type of apparatus shown in Fig. 1 for separating the object to be televised into its component images is by way of illustration only and that any suitable means may be used.

In order to maintain the scanning of the target 16 in synchronism, synchronizing circuits are provided. Suitable synchronizing circuits are well known and have been represented only schematically in Fig. 1 by block 55. To present the component images provided by the filter disc 50 in synchronism with the scanning of the target 16 by the cathode ray beam 18 of the tube 10, the filter disc 50 is driven by a synchronous motor 56. The motor 56 is operated under the control of synchronizing signals derived from the synchronizing circuits 55. One suitable way of so driving the filter disc 50 is shown in the aforementioned patent to Somers. Other arrangements are well known in the art and may be used without departing from the spirit of the invention.

The operation of this much of the invention is believed to be clear from a consideration of the above discussion. By way of recapitulation, a series of color component exposures are sequentially given to the pickup tube 10. Corresponding electrical charges appear in sequence on the target 16. The cathode ray beam 18 of the pickup tube 10 scans the target 16 in synchronization with and following in phase the exposure by the component color images. As a result there appears at the collector element 47 sequential sets of video signals each set of signals corresponding to the selected color component of one of the component images.

In the embodiment of the invention shown in Fig. 1, the output of the pickup tube 10, obtained from the collector element 47 is fed through a condenser 60 to a plurality of potentiometers 61, 62 and 63 (one for each selected color component) connected in parallel. By means of variable taps 65, 66 and 67 on these potentiometers adjustable portions of the output voltage are fed to a keying circuit 69 represented illustratively and schematically for the purpose of convenience by a mechanical commutator. In the embodiment shown, the commutator comprises a plurality of switching segments 70, 71, 72 (one for each of the potentiometers 61, 62 and 63) and a rotatable switch arm 73. It is necessary, for the proper operation of the invention, that the switch arm 73 be rotated so as to contact the segments 70, 71 and 72 in synchronism with the appearance of the sets of component color signals appearing at the output of the tube 10. This may be accomplished conveniently by driving the switch arm by the same motor 56 which drives the filter disc 50 as indicated by the dotted line 75. Alternatively a separate properly phased drive motor may be used operating under the control of signals from the synchronizing circuits 55 in a manner similar to the disc motor 56.

The switch arm 73 of the commutating arrangement 69 sequentially feeds the voltages appearing across the tapped portions of potentiometers 61, 62 and 63 back to the control grid 34 of the electron gun 19 of the tube 10 through a condenser 77. The sequentially produced sets of signals produced by the above described arrangement will produce corresponding voltages across all of the potentiometers 61, 62 and 63. However, due to the effect of the commuting device 69 only the voltage appearing across one of the tapped portions of the potentiometers will be fed back to the control grid 34 of the tube 10 at any one time. Assuming, for purposes of illustration, that the invention is employed in a three color system, the color components being red, blue and green, it will be clear that the voltages will be fed back to the control grid 34 of the tube 10 corresponding in sequence to only one of the color components. As a result each of the variable taps 65, 66 and 67 of the potentiometers 61, 62 and 63 may be individually and separately adjusted to vary the amount of feedback voltage applied to the tube 10 and thus control the amount of feedback during the presentation of any one of the color component images. In other words, the potentiometer 61 and its tap 65 controls only the amount of feedback voltage during the presentation of one color component image, say red, and similarly potentiometers 62 and 63 control only the feedback voltage during the presentation of the other color component images, say blue and green respectively.

Figures 2, 3, 6:
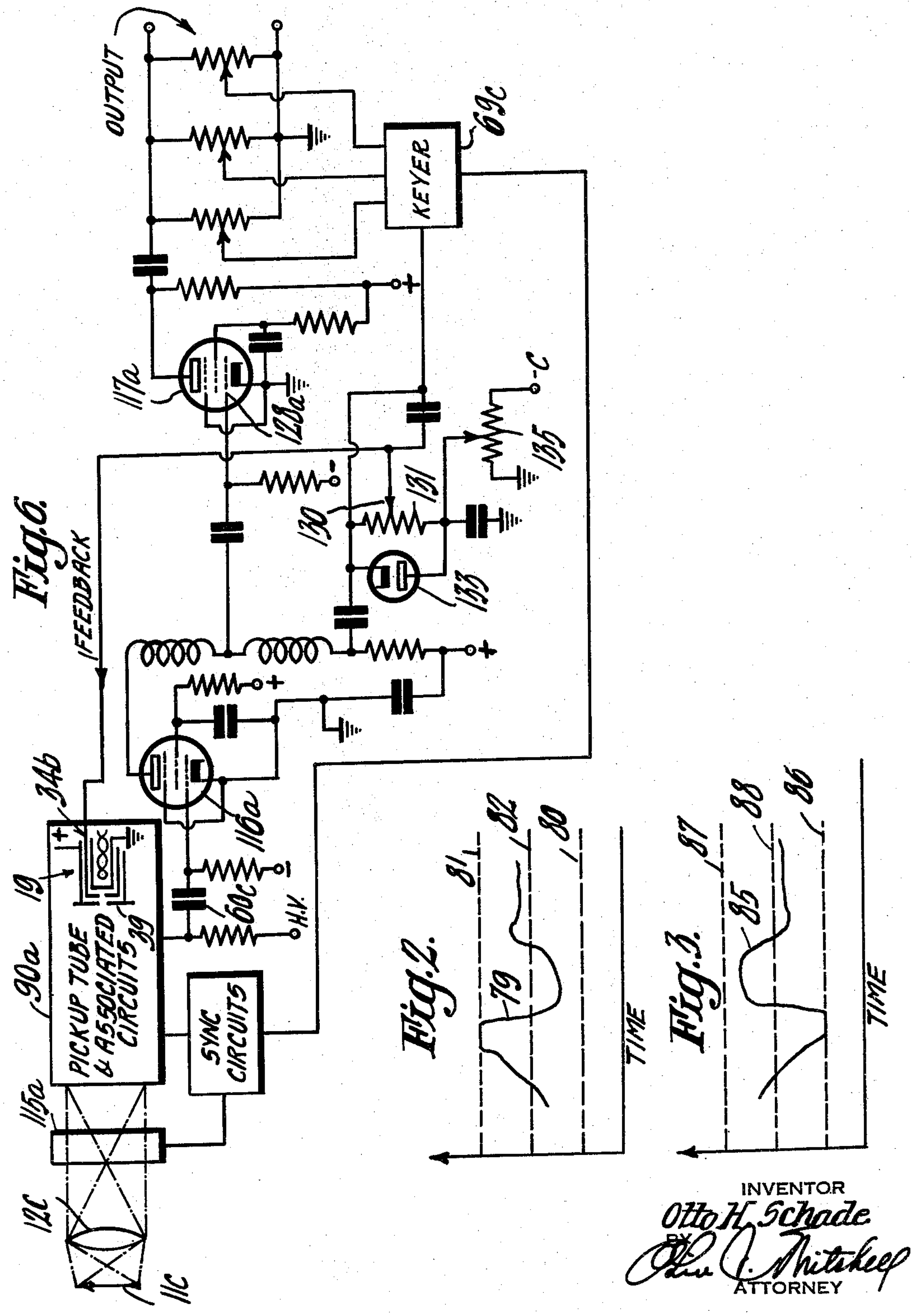
Fig. 2 is a graph indicative of an assumed pickup tube beam current.
Fig. 3 is a graph indicative of the output voltage produced by the beam current of Fig. 2.
Fig. 6 represents schematically an embodiment of the invention including means for providing a different form of clamping voltage; and, Fig. 7 represents schematically an embodiment of the invention using a single tube as a commutator.

The effect of the feedback voltages upon the operation of the tube 10 will now be discussed. Referring to Fig. 2, and keeping in mind the operation of the tube 10 as explained above, there is shown a graph 79 representative of the effect on the cathode ray beam as a result of scanning a color component image of an assumed scene. The assumed curve has been plotted with output current as ordinates and time as abscissa. The maximum picture brightness, which as noted above cause maximum absorption of electrons from the cathode ray beam, results in minimum output current and is represented by the dotted line 80. This may be termed the "white level." Minimum picture brightness, which as noted above causes minimum absorption of electrons from the cathode ray beam, results in maximum current output and is represented by the dotted line 81. This may be termed the "black level." The average value, or direct current component of the color component image is represented by the dotted line 82. The average value depends upon picture content and varies therewith.

This output current will produce a corresponding output voltage across potentiometers 61, 62 and 63 in accordance with the graph 85 shown in Fig. 3. Referring to that figure, the output voltage graph 85 has been plotted with output voltage as ordinates and time as abscissa. Here, due to the combined effect of line resistor 84 and condenser 60, minimum picture brightness and resulting maximum output current results in minimum output voltage across the potentiometers 61, 62 and 63. This condition is indicated by the dotted line 86 of Fig. 3. Similarly, maximum picture brightness results in minimum output current and maximum output voltage across the potentiometers 61, 62 and 63. This condition is represented by the dotted line 87. The average output voltage is represented by the dotted line 88 and will vary with component image color content.

The voltages sequentially fed back to the control grid 34 of the tube 10 modulate the scanning beam 18 as it leaves the electron gun 19 in opposite phase to that produced by the absorption modulation of the beam at the target 16. Thus at a given instant the charge on the target 16 will have a potential such as to absorb a certain amount of electrons from the cathode ray beam 18. This will result in a lowering of the number of electrons in or modulation of the return beam, i. e. from the target 16 to the first anode 36, and a lowering of modulation current. The lowering of modulation current in turn results in increasing the output voltage. A portion of this increased voltage is fed back to the control grid 34 of the tube 10 and results in an increased number of electrons in the beam 18 as it approaches the target 16. Since, at the given instant, the illumination is constant the charge will remain constant and the number of electrons absorbed will also remain constant. The overall effect, therefore, is to result in an increase in the number of electrons in the return path of the beam 18. This increase results in a decrease in output voltage. The system of the invention therefore provides inverse feedback which changes the voltage output in accordance with the feedback loop gain. In the present case the feedback loop starts at the target 16, where the sets of color component signals are generated in the form of modulated current, passes through the potentiometers 61, 62 and 63, the commutator system 69 and the control electrode 34 in the form of modulated voltage and returns to the target 16 in the form of the control grid modulated current.

Since the keying circuit 69 operates in synchronism with the appearance of the selected component signals at the tube 10, the feedback voltages are also applied in synchronism therewith. Thus, each time information corresponding to one color component is obtained by scanning the target of the tube 10 only one potentiometer will be effective in determining the amount of feedback voltage applied to the grid 34 of the cathode ray gun 19. Each potentiometer will therefore be effective in controlling the relative value of output voltage of one of the selected component colors. The potentiometers may be individually and separately adjusted so that the sets of color component signals generated at the target 16 by modulation of the return cathode ray beam will be of the desired value to provide the desired color balance.

As indicated above, the mechanical keying circuit 69 shown in Fig. 1 was only by way of illustration. There is shown in Fig. 4 an embodiment of the invention utilizing an electronic commutator in place of the mechanical commutator 69 shown in Fig. 1.

Figure 4:
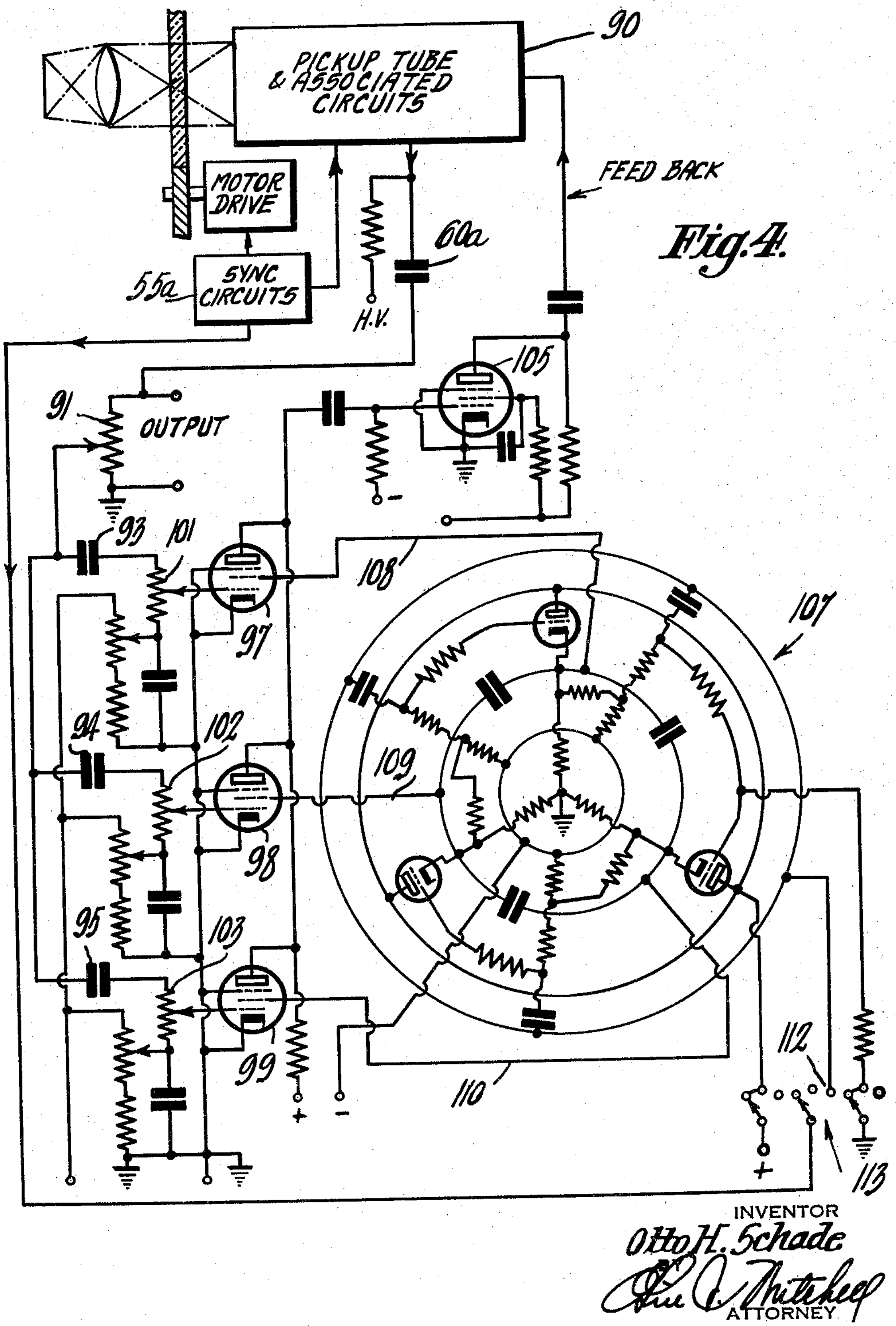
Fig. 4 is a schematic representation of a modified form of the invention using an electronic commutator.

Referring to Fig. 4, the tube 10 and its associated circuits have been indicated only generally by the box 90. It is to be understood that the tube 10 and its associated operating circuits are contained within the box 90 and perform the same as described in connection with Fig. 1. The output of the pickup tube is fed, as described above, through a condenser 60*a* to the output. However, in this embodiment of the invention, a single load potentiometer 91 replaces the three potentiometers 61, 62 and 63. For purposes of illustration, an electronic commutator of the type shown in United States Reissue Patent No. 22,672 granted August 28, 1945, to C. C. Shumard has been shown. It is to be understood that any electronic commutator which will sequentially switch a series of input signals may be used. The operation of this type of commutator is fully described in the aforementioned Shumard reissue patent. Briefly, in accordance with this embodiment of the invention input signals derived by tapping a portion of the output voltage appearing across the load potentiometer 91 are applied through the condensers 93, 94 and 95 to the control grids of three separate amplifying tubes 97, 98 and 99. The signal level applied to each of the control grids of the amplifying tubes 97, 98 and 99 may be individually and separately controlled by means of potentiometers 101, 102 and 103. The plates of the amplifying tubes 97, 98 and 99 and hence their outputs are connected in parallel. The three outputs feed a single amplifier tube 105. A ring type pulser 107 which includes three grid controlled tubes, of the gas discharge type in accordance with the Shumard disclosure, is so biased as to provide a repeating sequence of three output pulses. These pulses are applied over the lines 108, 109 and 110 to the screen grids of the three amplifying tubes 97, 98 and 99. The screen grids of the amplifying tubes 97, 98 and 99 are so biased that in the absence of a pulse from the ring pulser 107 the amplifying tubes are cut off and will not pass signals appearing at their control grids. In order to maintain the switching on of the amplifying tubes 97, 98 and 99 in synchronism with the presentation of component signals from the pickup tube, properly phased synchronizing signals derived from the synchronizing circuits 55*a* are applied to the ring pulser 107 through the contact 112 of switch 113. The output of the amplifying tube 105 is fed back to the control grid of the pickup tube as described in connection with the embodiment of the invention shown in Fig. 1.

The operation of the arrangement of Fig. 4 will be described only insofar as it differs from that shown in Fig. 1. Referring to Fig. 4 a portion of the output voltage appearing across the load potentiometer 91 is applied to the amplifying tubes 97, 98 and 99. These tubes are keyed on in sequence by pulses from the ring pulser 107 in synchronism with the scanning of the selected component color changes in the pickup tube. Thus each amplifier feeds to the amplifying tube 105 only signal voltages corresponding to a single color component. These signal voltages are fed back to the pickup tube in sequence and in synchronism with the color component signals from the pickup tube. Since each of the amplifying tubes 97, 98 and 99 only control one color component, the potentiometers 101, 102 and 103 in their input circuits may be individually and separately adjusted to control the amount of inverse feedback applied to the pickup tube for each color signal component. As a result these potentiometers may be individually and separately adjusted to obtain the desired color balance.

Figure 5:
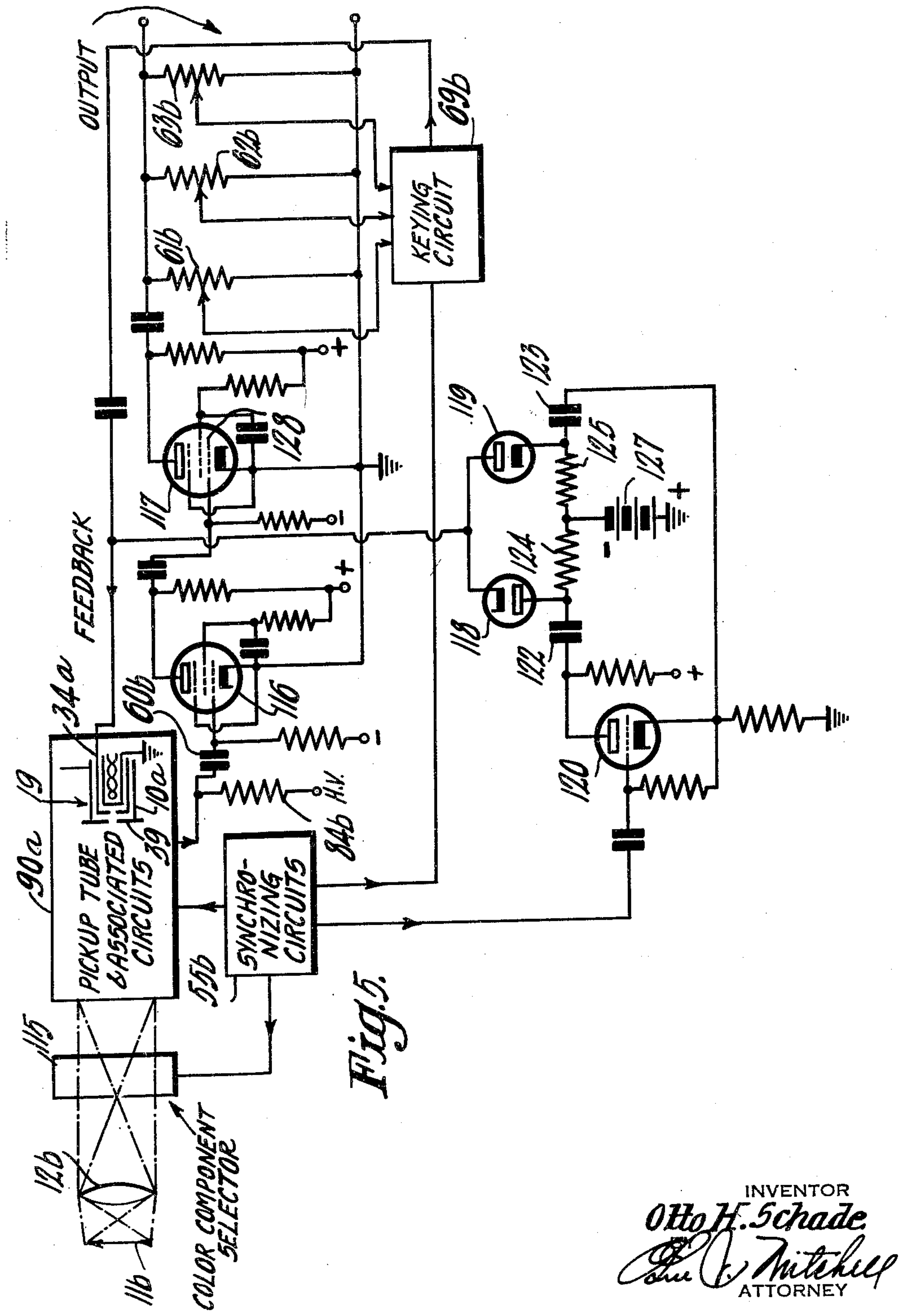
Fig. 5 represents schematically still another embodiment of the invention including means for providing a clamping voltage.

Referring to Fig. 5 there is shown partially in block diagram an embodiment of the invention utilizing a clamping circuit which will maintain the black level signal constant at the control grid of the pickup tube. The image, scene or object 11*b* to be televised is, as above described, focused through lens 12*b* onto the pickup tube and its associated operating circuits 90*a* through color component image separating apparatus 115. The output signal from the pickup tube is applied to an amplifier tube 116 which in turn feeds a second amplifier tube 117. A clamping circuit comprising two diodes 118 and 119 is driven by push-pull pulses derived from the plate and cathode of a keying tube 120. The two diodes are driven through two capacitors 122 and 123 and are connected by two resistors 124 and 125, the common point of which is grounded through a source of voltage represented by the battery 127.

The operation of clamp circuits of this type is fully described in United States Patent No. 2,299,945 granted October 27, 1942, to K. R. Wendt. Briefly, keying pulses derived from the synchronizing circuits 55*b* and occurring within the horizontal blanking periods are applied to the keying tube 120. During the pulse time of each pulse, which coincides with black level signals from the pickup tube, the grid 34*a* of the pickup tube 90*a*, is brought to a level equal to the voltage of the source 127. The black level voltage is thus reset to a constant voltage at the grid 34*a* by the clamping pulses. By suitably adjusting the voltage of the source 127 by known and suitable means, the clamp level and the corresponding black level beam current of the pickup tube can be held constant at any desired value.

The remainder of the circuitry of Fig. 5 is similar to that shown in Fig. 1 and operates in the same manner. Thus the sets of color component signals sequentially appearing in the output of the pickup tube pass through the amplifier circuit and appear across the potentiometers 61*b*, 62*b* and 63*b*. Tapped portions of the voltages appearing across these potentiometers feed the keying circuit 69*b* which may be of either the mechanical or preferably the electronic type having the same input and output signal polarity, and are fed back to the control grid of the electron gun of the pickup tube. Color balance is achieved in the same manner as described above. In this embodiment, however, the sets of color component signals at the pickup tube grid are clamped at black level.

In Fig. 6 there is shown one suitable color component signal generating arrangement utilizing the invention and providing a variable degree of direct current restoration at the pickup tube grid. As described above, the image scene or object 11*c* to be televised is focused by a lens arrangement 12*c* upon the pickup tube through color component selecting apparatus 115*a*. The pickup tube and its associated operating circuits is represented by the block 90*a*. The output from the pickup tube is obtained through condenser 60*c*. In this embodiment of the invention, the output is applied to an amplifier tube 116*a*. The output of the amplifier tube 116*a* is fed to a second amplifier tube 117*a*. The output of the system is taken from the tube 117*a*. Inverse feedback voltages are sequentially fed back to the control grid 34*b* of the gun of the pickup tube through the keyer 69*c* as explained above. The control grid 34*b* of the pickup tube electron gun is clamped at a level determined by the setting of the tap 130 on a potentiometer 131. The potentiometer 131 derives its voltage by means of the illustrated arrangement wherein a portion of the feedback signal voltage is rectified by a diode 133. The grid bias for the electron gun and hence the beam current level at zero video signal is set by means of a potentiometer 135 which is placed across a suitable source of biasing potential not shown.

With the tap 130 of potentiometer 131 in its uppermost position, the full rectified voltage is applied to the control grid of the amplifying tube 117*a* and the black level beam current of the pickup tube will be maintained constant. When the tap 130 is moved to its bottom position, the control grid of the pickup tube gun is maintained at an average voltage equal to the c-bias set on the potentiometer 135, maintaining a constant average beam current. Intermediate positions give partial direct current component restoration.

Figure 7:
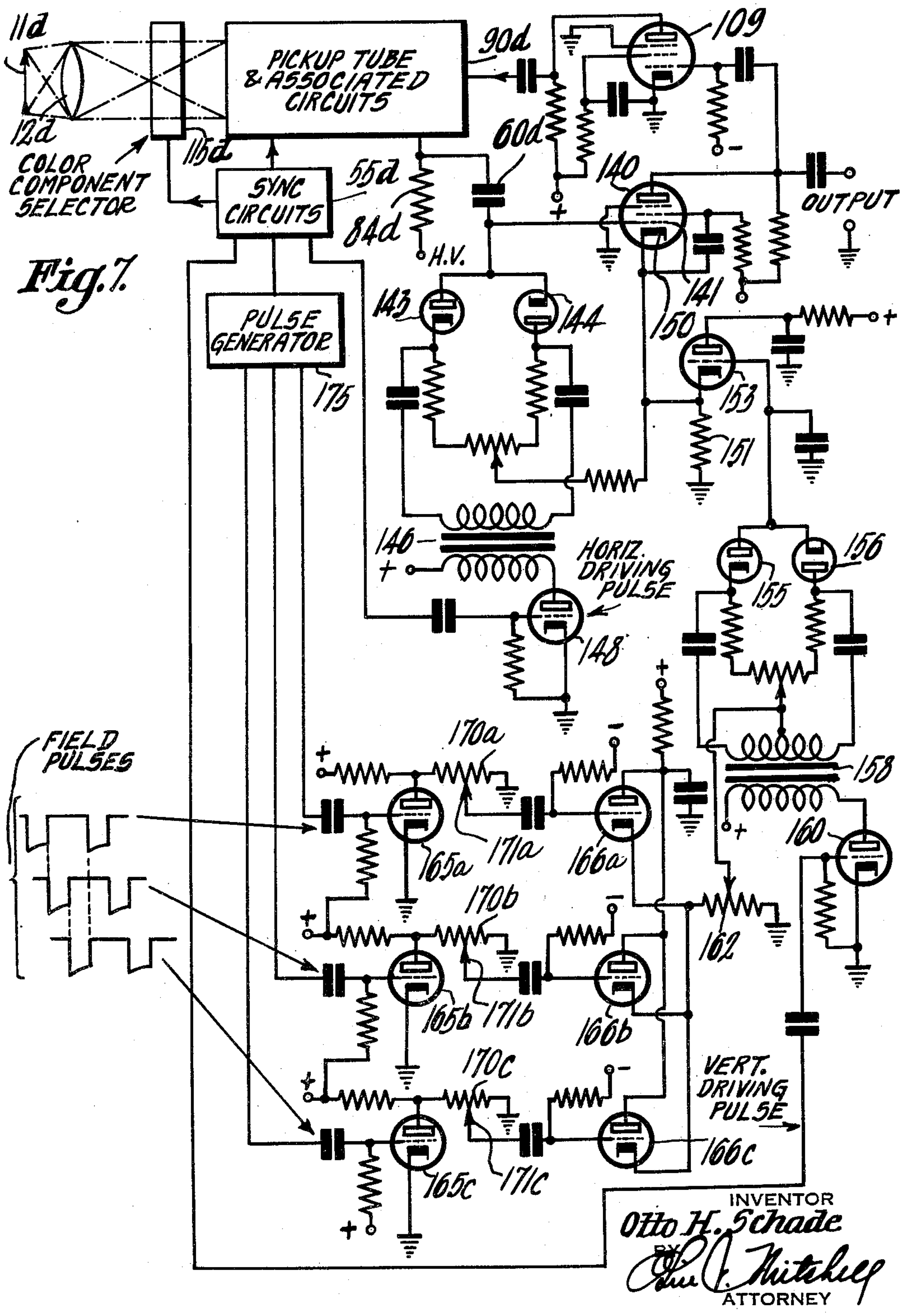

Referring now to Fig. 7 there is shown, partially in block diagram, an embodiment of the invention in which the commutating effect is obtained through a single amplifier. The block arrangement is similar in operation to that already described in connection with the preceding embodiments and no further description is believed to be necessary. The output signals from the pickup tube are all supplied to a single amplifier 140. In shunt with the control grid 141 of the amplifier 140 there is provided the direct current reinsertion arrangement comprising the back-to-back connected diodes 143 and 144. The operating pulses for this arrangement are derived from a transformer 146. The transformer is activated by horizontal driving pulses derived in a conventional manner from the synchronizing circuits 55*d* and fed to it through a tube 148. This arrangement is provided to set the level of the grid 141 of tube 140 at a constant operating point and maintain a constant plate current in 140 during horizontal line retrace time regardless of changes in the cathode voltage of the amplifier tube 140.

The cathode 150 of the amplifying tube 140 is returned to ground through the cathode resistor 151. This cathode resistor is shunted by the variable cathode impedance of the tube 153. The operating level of the tube 153 is controlled by a clamp arrangement comprising the back-to-back diodes 155 and 156. These diodes receive their operating potential from a transformer 158. The transformer is activated by vertical sync pulses derived from the sync circuits 55*d* in a conventional manner and fed to it through a tube 160. With this arrangement, the variable impedance tube 153 controls the gain of the amplifier tube 140 as a function of the grid voltage applied to the variable impedance tube 153. In turn, the level of the voltage applied to the grid of the tube 153 is set by the back-to-back arrangement of the diodes 155 and 156. Since these diodes are pulse operated from the vertical sync pulses, the grid voltage level of the variable impedance tube is set during vertical retrace time and remains constant at that level between pulses.

In order to provide separate and individual control of each set of component color signals, level control bias is applied to the secondary of the transformer 158 from a potentiometer 162. This potentiometer is energized by a sequential series of voltage pulses derived under the control of three channels each comprising a pulse amplifier tube 165*a*, 165*b*, or 165*c* and a control tube 166*a*, 166*b* or 166*c*. For purposes of brevity only one channel will be described, the construction and operation of the remaining channels being the same.

Assuming a full series of color component signals to occupy a cycle of 360°, the pulse amplifier tube 165*a* will be keyed off by pulses derived under the control of the synchronizing circuits 55*d* for not more than 120° of the cycle. The pulses may be derived from a pulse generator 175 similar to the pulser 107 described in connection with the arrangement of Fig. 4 or any other suitable pulse source.

During the pulse period a predetermined positive potential will appear across the potentiometer 170*a*. By means of the tap 171*a* a portion thereof is applied as grid bias to the control tube 166*a*. Since the discharge path of the control tube 166*a* includes the potentiometer 162, a corresponding positive voltage will appear thereacross. In a similar manner the remaining channels are keyed on at successive 120° intervals and produce corresponding voltages across the potentiometer 162.

The voltage components across the potentiometer 162 will vary in accordance with the grid pulse voltage of the control tubes 166 which in turn varies in accordance with the setting of the potentiometers 170. During the vertical blanking time the clamp circuit including the diodes 155 and 156 transfer the voltage on potentiometer 162 to the grid of the impedance tube 153 thus changing its impedance and hence the gain of tube 140 in a field sequential manner. Since the channels are operated in synchronism with the color component signals from the pickup tube, the gain of each color component signal train in the amplifier tube 140 may be individually and separately controlled by the potentiometer 170*a*, 170*b* or 170*c*. The overall gain of the component color signals may be varied by means of the bias potentiometer 162. Thus, the degree of feedback applied to the pick-up tube from the amplifying tube 140 over tube 190 may be individually adjusted for each color component so that the signals generated by the pickup tube will have the desired color balance. The video signal output may be taken out past the control tube 140 as shown or may be taken out ahead of the control tube 140 or after the tube 109 since, due to the operation as just described color balance will be obtained at all of these points.

What is claimed is:

1. Television signal generating apparatus comprising in combination scanning ray beam means for developing a plurality of different selected component color representative video signals, scanning ray beam modulating means, means for applying said different selected component color representative video signals to said scanning ray beam modulating means in a degenerative sense and means for independently adjusting the magnitude of the different selected component color representative video signals applied to said scanning ray beam modulating means.

2. Television signal generating apparatus comprising in combination a pickup tube having a cathode ray beam and an output electrode, said cathode ray beam adapted to produce an image detail signal at said output electrode, means connected to said output electrode for modulating said beam with said image detail signal in such a polarity that it has a degenerative effect on said image detail signal at said output electrode, and means for modulating said beam in accordance with image information corresponding to different selected color components of an image.

3. The invention as set forth in claim 2 and wherein means are provided for independently adjusting the amount of said beam modulation in a degenerative sense for each of the image detail signals representative of different selected color components.

4. The invention as set forth in claim 3 and wherein said different color components occur sequentially.

5. Signal generating apparatus comprising in combination a pickup tube having a cathode ray gun provided with a control electrode, a target adapted to be scanned by the cathode ray beam produced by said gun and an output electrode, a variable impedance connected to said output electrode across which output voltages are developed, means feeding at least a portion of said output voltages in a degenerative sense to said control electrode, means sequentially charging said target in accordance with color component video information, and means varying the impedance of said variable impedance in synchronism with the charging of said target.

6. Signal generating apparatus in accordance with claim 5 including individual and separate means whereby said impedance may be adjusted to have a predetermined value during the scanning of each color component charge on said target.

7. Television signal generating apparatus comprising in combination, a pickup tube having a cathode ray beam, a cathode ray gun including a grid, and an output electrode, means connected to said output electrode developing an output voltage, means for modulating said beam by at least a portion of said output voltage in a polarity to have a degenerative effect on said output voltage, means modulating said beam in accordance with video information corresponding to a selected color component to produce output voltages corresponding to said selected color component, means generating similarly produced output voltage corresponding to other selected color components, and means providing direct current restoration at said grid.

8. A television signal generating apparatus comprising in combination means for generating a scanning ray beam, means associated with said scanning ray beam generating means for developing an image detail representative signal, means associated with said scanning ray beam developing means for modulating said scanning beam, a video signal carrying circuit operatively connected between said image detail representative signal developing means and said scanning beam modulating means, said video signal carrying circuit including means for applying said image detail representative video signal to said scanning ray beam modulating means in a polarity to have a degenerative effect on said developed image detail representative signal.

References Cited in the file of this patent

UNITED STATES PATENTS

| | | |
|---|---|---|
| 2,389,039 | Goldsmith | Nov. 13, 1945 |
| 2,451,640 | Thalner | Oct. 19, 1948 |
| 2,543,772 | Goldmark | Mar. 6, 1951 |
| 2,548,829 | Sziklai | Apr. 10, 1951 |